United States Patent [19]

Millioud

[11] Patent Number: 5,032,222
[45] Date of Patent: Jul. 16, 1991

[54] SPRAY DRIER FOR THE PREPARATION OF POWDERS, AGGLOMERATES AND THE LIKE

[75] Inventor: Alain Millioud, Allschwil, Switzerland

[73] Assignee: Ciba-Geigy Corporation, Ardsley, N.Y.

[21] Appl. No.: 212,394

[22] Filed: Jun. 27, 1988

[30] Foreign Application Priority Data

Jul. 3, 1987 [CH] Switzerland .................. 2537/87

[51] Int. Cl.$^5$ .................. B01D 1/18; B01D 1/20
[52] U.S. Cl. .................. 159/4.1; 34/57 E; 159/16.1; 159/48.1; 202/236; 203/90; 209/133; 209/138; 209/139.2; 209/145; 239/222; 239/223; 239/575; 239/687
[58] Field of Search .................. 159/4.01, 27.1, 4.2, 159/16.1, 25.2, 48.1, 900; 202/236; 203/49, 90; 34/57 E; 239/575, 222, 223, 687; 209/133, 145, 138, 139.2

[56] References Cited

U.S. PATENT DOCUMENTS

| | | | |
|---|---|---|---|
| 1,426,030 | 8/1922 | Zimmermann | 159/4.1 |
| 1,950,069 | 3/1934 | Stein | 209/139.2 |
| 1,989,406 | 1/1935 | Doolittle | 159/4.06 |
| 2,280,073 | 4/1942 | Hall | 159/4.1 |
| 3,013,734 | 12/1961 | Hischmann | 209/139.2 |
| 3,308,949 | 3/1967 | Schauer | 209/139.2 |
| 3,423,843 | 1/1969 | Laguilharre | 159/4.06 |
| 3,596,699 | 8/1971 | Okada | 159/4.01 |
| 3,656,618 | 4/1972 | Janich | 209/139.2 |
| 3,740,865 | 6/1973 | Laguilharre | 159/4.01 |
| 3,901,794 | 8/1975 | Henne et al. | 209/139.2 |
| 3,963,559 | 6/1976 | Petersen et al. | 159/4.06 |
| 4,035,120 | 7/1977 | Eriksson | 156/62.2 |
| 4,066,535 | 1/1978 | Strauss | 209/139.2 |
| 4,141,783 | 2/1979 | Pisecky et al. | 159/4.4 |
| 4,229,249 | 10/1980 | Felsuang et al. | 159/4.01 |
| 4,236,321 | 12/1980 | Palmonari et al. | 34/57 E |
| 4,321,134 | 3/1982 | Leschonski et al. | 209/133 |
| 4,380,491 | 4/1983 | Joy et al. | 159/4.01 |
| 4,470,902 | 9/1984 | Yoshimori | 209/139.2 |
| 4,693,811 | 9/1987 | Lohnherr | 209/139.2 |
| 4,713,146 | 12/1987 | Ek | 159/4.01 |

FOREIGN PATENT DOCUMENTS

| | | | |
|---|---|---|---|
| 849350 | 7/1949 | Fed. Rep. of Germany . | |
| 2027258 | 12/1971 | Fed. Rep. of Germany | 209/139.2 |
| 1507729 | 3/1972 | Fed. Rep. of Germany | 209/139.2 |
| 3538832 | 5/1987 | Fed. Rep. of Germany | 209/145 |
| 0251511 | 11/1987 | Fed. Rep. of Germany | 209/139.2 |
| 3808023 | 9/1989 | Fed. Rep. of Germany | 209/139.2 |
| 374972 | 3/1964 | Switzerland . | |
| 1286303 | 1/1987 | U.S.S.R. | 209/145 |

OTHER PUBLICATIONS

Chem. Ing. Tech., 59, No. 2, 112–117 (1987).
VDI, Leschonski, 12/2–3/86.

Primary Examiner—Virginia Manoharan
Attorney, Agent, or Firm—Harry Falber

[57] ABSTRACT

A spray drier (1) for the preparation of powders, agglomerates or the like, by the drying of pumpable products, has at an inlet (6) of its exhaust discharge line or lines (7) for the drying gas used in its drying chamber (3), a wind sifter (9) with a rotating bucket wheel (10). The flow generated by the rotating bucket wheel (10) of the wind sifter (9) acts against the exhaust suction flow. The discharge of fine materials is directed into the exhaust line (7) and the coarse material discharge (8) takes place in the drying chamber (3). Consequently, excellent desired separation of the coarse material component from the fine material component can be obtained within the drying chamber.

20 Claims, 5 Drawing Sheets

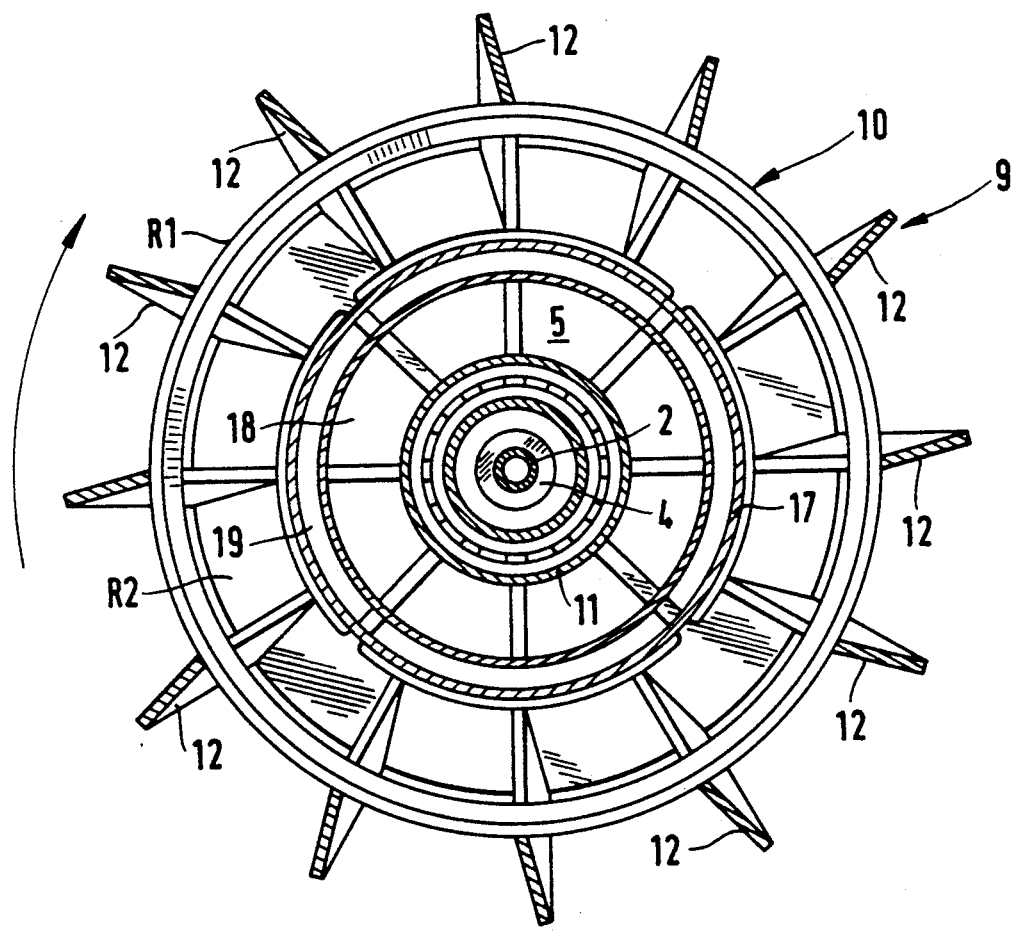

SPRAY DRIER FOR THE PREPARATION OF POWDERS, AGGLOMERATES AND THE LIKE

BACKGROUND OF THE INVENTION

The invention relates to a spray drier for the preparation of powders, agglomerates and the like, by the drying of pumpable products.

Spray driers of this type are known in different configurations as disk, nozzle and fluidizing spray driers and are also used as agglomerators. Different operating modes and configurations of such spray driers are described in Chem.-Ing. Tech. 59 (1987), No. 2, pages 112 to 117. As a brief summary, three principal variants of spray driers are described; i.e., disk spray driers with a swirling distribution of the hot air serving as the drying gas, nozzle spray driers with or without a swirling distribution of the drying gas and finally, fluidized spray driers with an axial hot air supply from the top, a fluid bed on the bottom and powder recycling into the drying chamber, which is in the form of a tower. As a rule the wet material to be dried and sprayed is introduced from the top. The drying chambers have two principle outlets, i.e. the product discharge for discharging the coarse, grain material or product material proportion directly from the drying chamber or laterally from the integrated fluid bed and the discharge line for the drying gas or exhaust gas, which carries with it a fine proportion of the product. The fine material proportion entrained by the drying gas or the exhaust gas is recovered by cyclones and/or filters and may either be recycled, (primarily in installations which are able to carry out agglomerations) into the drying chamber, or may be further processed separately.

The quantity of this fine material component which is entrained by the drying gas depends on different factors, such as the fineness of the atomization, the proportion of the product itself, the agglomeration effect, and the precipitation within the drying chamber.

Usually, the product is demanded in a form in which it contains only very small quantities of the fine material, so as not to exceed the minimum required grain sizes, and in particular to prevent excessive dusting. It can be very expensive to re-process the fine material components obtained, so that they again are usable.

Different layouts are known whereby the coarse material yield is improved and the excessive entrainment of coarse material in the exhaust air prevented, and wherein it is also intended to insure that the smallest possible quantity of fine material arrives in the coarse material discharge of the tower or drying chamber.

Thus, for example, an embodiment is known from U.S. Pat. No. 2,280,073, wherein the drying air is blown in by a cyclone. The cyclonic flow of the drying air in combination with the rotating atomization of the wet material is intended to effect the separation of the dry coarse material from the drying gas as a result of the higher centrifugal force acting on the material. The rotating atomizer located in front of the coaxial drying air inlet and outlet openings also acts as a fan, thereby enhancing the suction effect of an external pump. To separate the fine material extrained in the drying air, expensive filter installations or the like are provided in the exhaust flow direction downstream of the fan. The apparatus described is designed for a specific product and is relatively difficult to reset for products with different grain size distributions.

Spray driers are also known in which the exhaust air is discharged centrally by means of a kind of snorkel projecting radially into the lower area of the drying chamber, or installed axially on the bottom. The separation of the coarse material proportion from the proportion of fine material depends primarily on the swirl intensity of the drying gas within the drying chamber and the flow conditions around and upon its entry into the discharge line. Configurations are known for example from U.S. Pat. No. 3,963,559, British Patent Publication GB 2 020 986 or German Patent Publication DE 849,350, wherein in order to obtain suitable flow conditions, additional covers in the form of hats or the like, are placed over the discharge line. The separating apparatus known from CH 374 972 obtains this effect by a hat-shaped rotor in combination with a stator. Other configurations provide a plurality of tangential nozzles in the area of the discharge line in order to create conditions of flow, whereby the dust particles dispersed into the air are divided into coarse and fine components.

Spray driers, such as that described for example in U.S. Pat. No. 1,426,030, are further known, in which cyclones are used for the separation of the coarse material from the drying medium, and wherein the fine material entrained in the drying air is again recycled into the drying chamber. Additional spray driers of this type, used mainly for agglomeration, contain two outlets for the exhaust air in the roof of the drying chamber or tower. In these installations the separation of the coarse and fine material depends primarily on the mean axial flow velocity within the drying chamber, under the roof.

A common problem with all of these spray driers is that too much coarse material (grains) is being exhausted with the fine material. Although this may be recovered by subsequent screening or sifting, to do so would require additional space, together with filters or sifters. Furthermore, there is the risk that the product may be damaged for example in a cyclone, so that the grains would become fine. Finally, screening has a relatively low efficiency. A solution which uses tangential nozzles within the cone of the tower involves the risk of damage to the product in the outlet cone by abrasion, and requires the exhaust air filter to be dimensioned larger in view of the recycled volume of air. In a further solution which uses a moving hat, the moving hat requires a relatively large amount of space within the drying chamber and reduces the drop height which is important for drying. Furthermore, the product impacts upon the moving hat and becomes encrusted at the upper tip of the moving hat.

All of the known apparatuses have relatively large dimensions for the hat diameter or the tower diameter and thus need more space and have correspondingly higher costs. They are for the most part designed in a product specific manner and may be, if at all, only reset for other grain size distributions with difficulty.

SUMMARY OF THE INVENTION

The object of the present invention, therefore, is to provide a spray drier of the abovementioned type, wherein within the drying chamber a better separation boundary may be obtained between the grain material and the fine material such that a higher proportion of the grain material formed in the drying chamber remains therein and may be discharged from it, and the entrainment of the grains by the drying gas exhausted, may be reduced. The drying chamber should be as compact and as simple in its design as possible, and hats and the like located inside should be avoided. Furthermore, simple subsequent adjustments or resetting of the ratio of the discharge of coarse material to the fine material component should be possible to permit adaptation of the spray drier to different products.

BRIEF DESCRIPTION OF THE DRAWINGS

Other objects and advantages of the present invention will become apparent from the following detailed description of preferred embodiments as described in conjunction with the accompanying drawings, wherein like elements are assigned like reference numerals, and wherein:

FIG. 6 shows a section on the line VI—VI of FIG. 5.

DETAILED DESCRIPTION OF THE INVENTION

Figure 1:
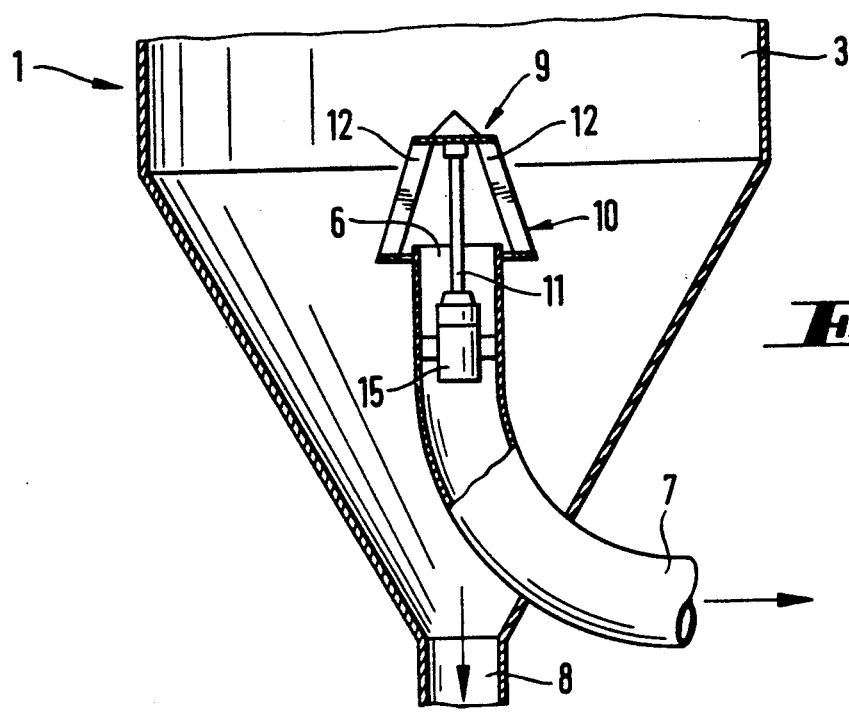
FIG. 1 shows the lower part of a toner or drying chamber of a spray drier in an axial section.

The spray driers 1 shown in FIGS. 1 to 4 are used for the preparation of powders, agglomerates or the like, by feeding pumpable wet products through the lines 2, (not shown in FIGS. 1 and 2, but visible in FIGS. 3 to 5) into a drying chamber 3, wherein at the outlet of each of the lines 2 an atomizing or spray apparatus 4 is provided. The spray driers 1 further comprise at least one connection and inlet 5 for a drying gas (arrow H), preferably for hot air or an inert gas. In addition, on the drying chambers 3 in the embodiments according to FIGS. 1, 2 and 4, a connection and inlet 6 of a discharge line 7 for the used drying gas and the material entrained therein, are provided, while in the case of FIG. 3 two such inlets 6 are provided in the discharge lines 7. The drying chambers 3 further comprise a powder discharge outlet 8 for the grain material produced in them.

At the inlet 6 of the discharge lines 7 for the used drying gas and the material entrained therein, a wind sifter designated in its entirety by 9 and having a rotating bucket wheel 10, is provided in all of the examples of embodiments. The air flow (arrow W) produced by the rotating bucket wheel 10 of the wind sifter is directed against exhaust flow (arrow A), so that the fine materials remaining within the flow of exhaust air are discharged with the flow of exhaust air into the exhaust line 7 and the coarse materials are discharged in the drying chamber 3. By this measure the coarse material component entrained by the exhaust air (arrow A) is reduced in a surprisingly simple manner and the yield of the spray drier 1 relative to such coarse or grain material is increased. In addition, because the portion of the material entrained by the exhaust air is reduced, a lesser effort is required for its recovery and recirculation.

Wind sifters of this type and their fundamental mode of operation are known, as described for example in a preprint of the VDI (Verein Deutscher Ingenieure=-Society of German Engineers), Association for Process Technology and Chemical Engineering, paper by Prof. Dr.-Ing. Kurt Leschonski (Dept. of Mechanical Process Technology, Clausthal Technical University), Koln, Dec. 2 and 3, 1986, Meeting on "The Technology of Gas/Solids Flow". The description of the wind sifter 9 is thus restricted to the characteristics essential for the invention.

The bucket wheel 10 of the wind sifter comprises a number of blades 12, a shown in FIG. 6, distributed uniformly over the circumference of two concentric rings R1, R2 which are mounted spaced apart on a common drive shaft 11.

Figure 2:
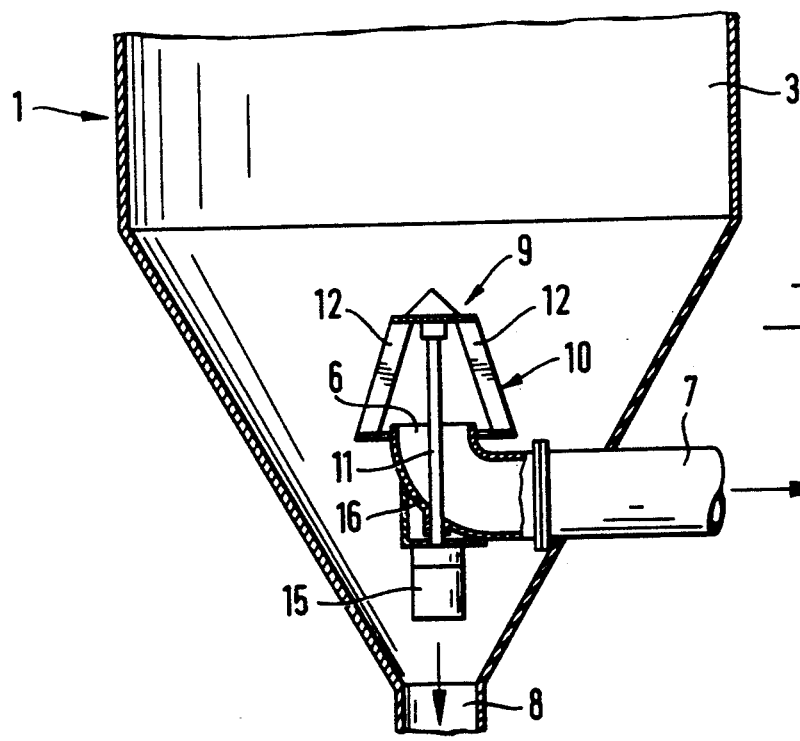
FIG. 2 shows a further preferred embodiment in a view corresponding to FIG. 1.
Figure 3:
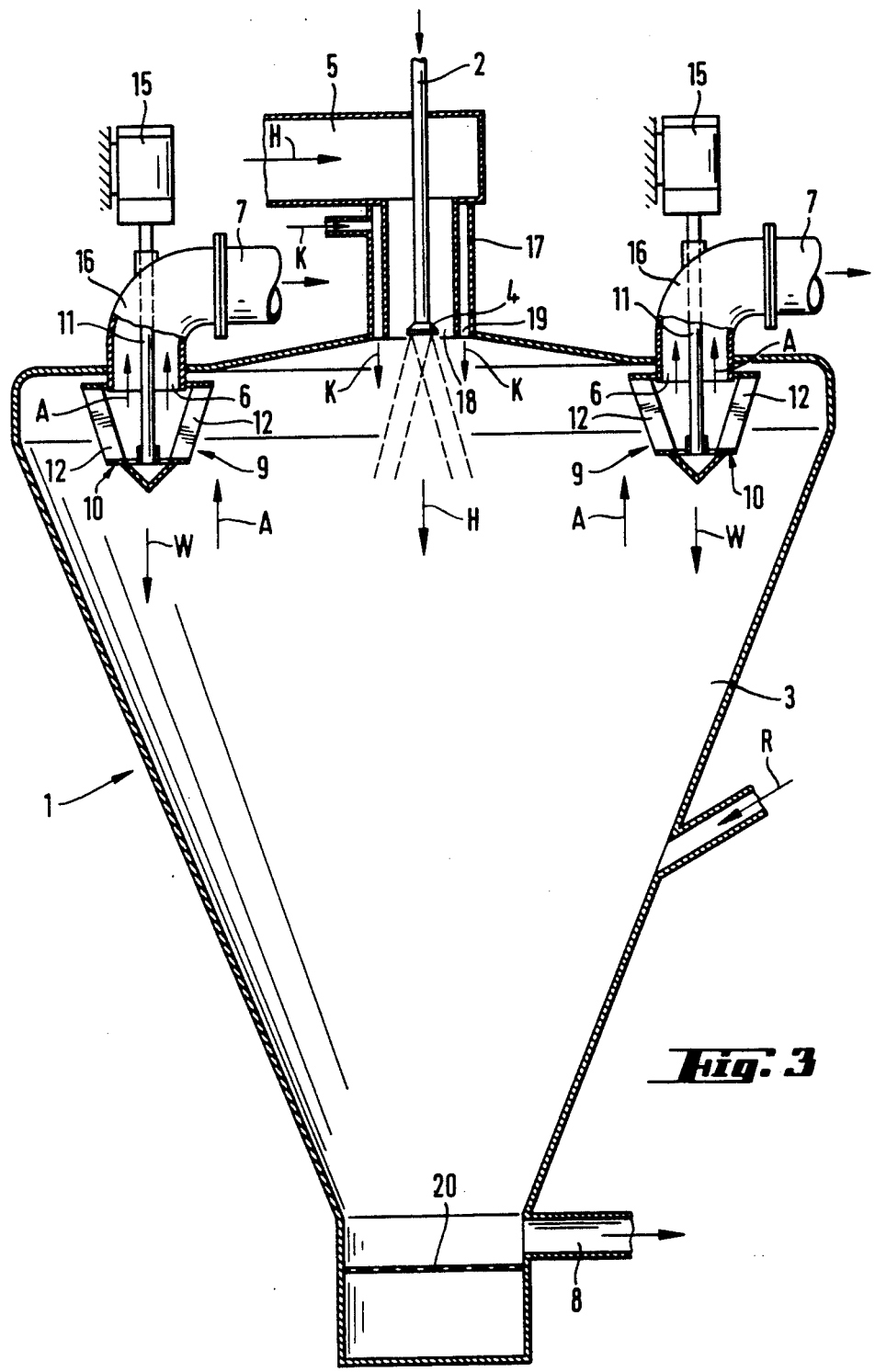
FIG. 3 shows another example of a preferred embodiment of a spray drier and agglomerator in an axial section view.

The blades 12 of the bucket wheel 10 are in the form of ridges or straight blades. The width of the intervals between the individual blades preferably corresponds to the approximate width of the area of the circumference covered by the blades 12. Relative to the direction of rotation of the bucket wheel 10, the ridge like blades 12 are inclined to the rear with respect to the radius of the ring, beginning at the point of their fastening to the ring, as shown in FIG. 6. The bucket wheel 10 is preferably conical, with the ring R1 having the larger circumference and being located directly in front of the inlet 6 into the exhaust line 7. The internal diameter of the ring R1 directly in front of the inlet 6 of the exhaust line 7 is slightly larger than the diameter of the line 7. In this area then, the highest circumferential velocity of the blades 12 and thus the highest centrifugal force is obtained in a desirable manner. Thus, the residual coarse material content in the exhaust air may be centrifuged out in this area after the volume of the coarse component has already been appreciably reduced over the height of the sifter 9. A deflector cone may be set onto the second ring R2 of the bucket wheel 10, which is smaller in diameter, as shown in FIGS. 1 to 3.

The size of the bucket wheel 10 (diameter, height) and the number of blades 12 is controlled by the type of the material to be sifted, the throughput desired and the dimensions of the discharge line or lines 6.

In the case of conical bucket wheels the smaller diameter is chosen to be about 40 to 70% of the larger one. Usually, bucket wheels with a larger diameter of approximately 0.2 m to 3.0 m and a height corresponding to the larger diameter, are employed.

The number of blades 12 is customarily of the order of approximately 5 to 50 pieces. The depth (width) of the blades 12 of the sifter 9 is a factor which is chosen relative to the limit of separation of the sifter 9 and usually is between about 20 mm and 200 mm.

The drive shaft 11 of the rotating bucket wheel 10 of the wind sifter 9 coincides in all of the embodiments shown in the Figs. with the axis of the discharge line 7 at its inlet 6. As a rule, the fine material component discharge of a wind sifter takes place in its axial direction, while the coarse material in such an operation is removed radially by the centrifugal force and in part by deflection from the blades 12.

A motor 15 is coupled with the drive shaft 11 of the bucket wheel 10, whereby the rpm of the rotating bucket wheel 10 may be set and preferably varied, so that a good adaptation of the exhaust suction and the counter flow to the coarse material proportion desired and the product to be processed, is possible.

In the embodiment according to FIG. 1, the drive motor 15 for the draft shaft 11 of the sifter 9 is located within the discharge line 7, which leads out of the drying chamber 3 over a bend with a relatively large bending radius. In the embodiments according to FIGS. 2 to 5, the discharge line 7 comprises a deflecting elbow 16 after its inlet 6. The drive shaft 11 for the rotating bucket wheel 10 passes through the elbow 16 and its outer wall having the larger bending radius, with the drive motor 15 being located outside the elbow 16. It is readily accessible in this location and any cooling that potentially may be required may be accomplished simply, together with any regulation. This layout is possible in the embodiment according to FIG. 2 where the inlet 6 into a discharge line 7 is located in the lower area of the drying chamber 3, with the motor 15 then being placed inside the drying chamber 3 or, with an appropriate transmission, outside said chamber. This layout is also possible in the embodiment according to FIG. 3, in which the elbows 16 of the two discharge lines 7 are located largely above and outside the drying chamber 3, so that the drive motors 15 are always outside the drying chamber 3.

Figure 5:
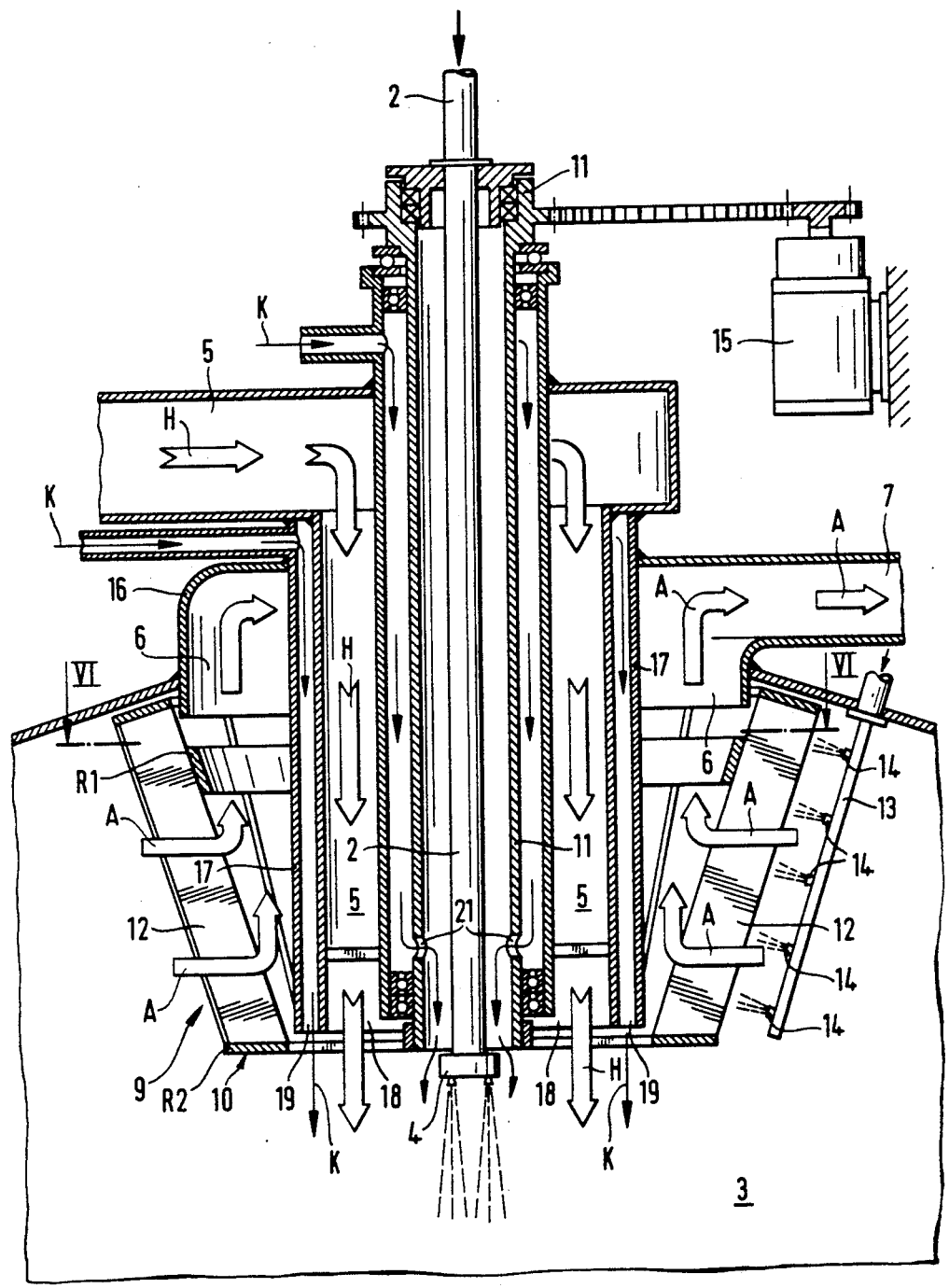
FIG. 5 shows a detailed view from FIG. 4, enlarged.

FIG. 5 shows a compressed air line 13, leading to the wind sifter 9 and one or several outlet nozzles 14 directed against the area of the blades 12 to operate as cleaning nozzles for the blades 12 and the bucket wheels 11. In this manner the sifter may be cleaned during operation as well as in the case where there is a change in the wet product to be dried, this being possible in all of the embodiments shown in the Figs.

Figure 4:
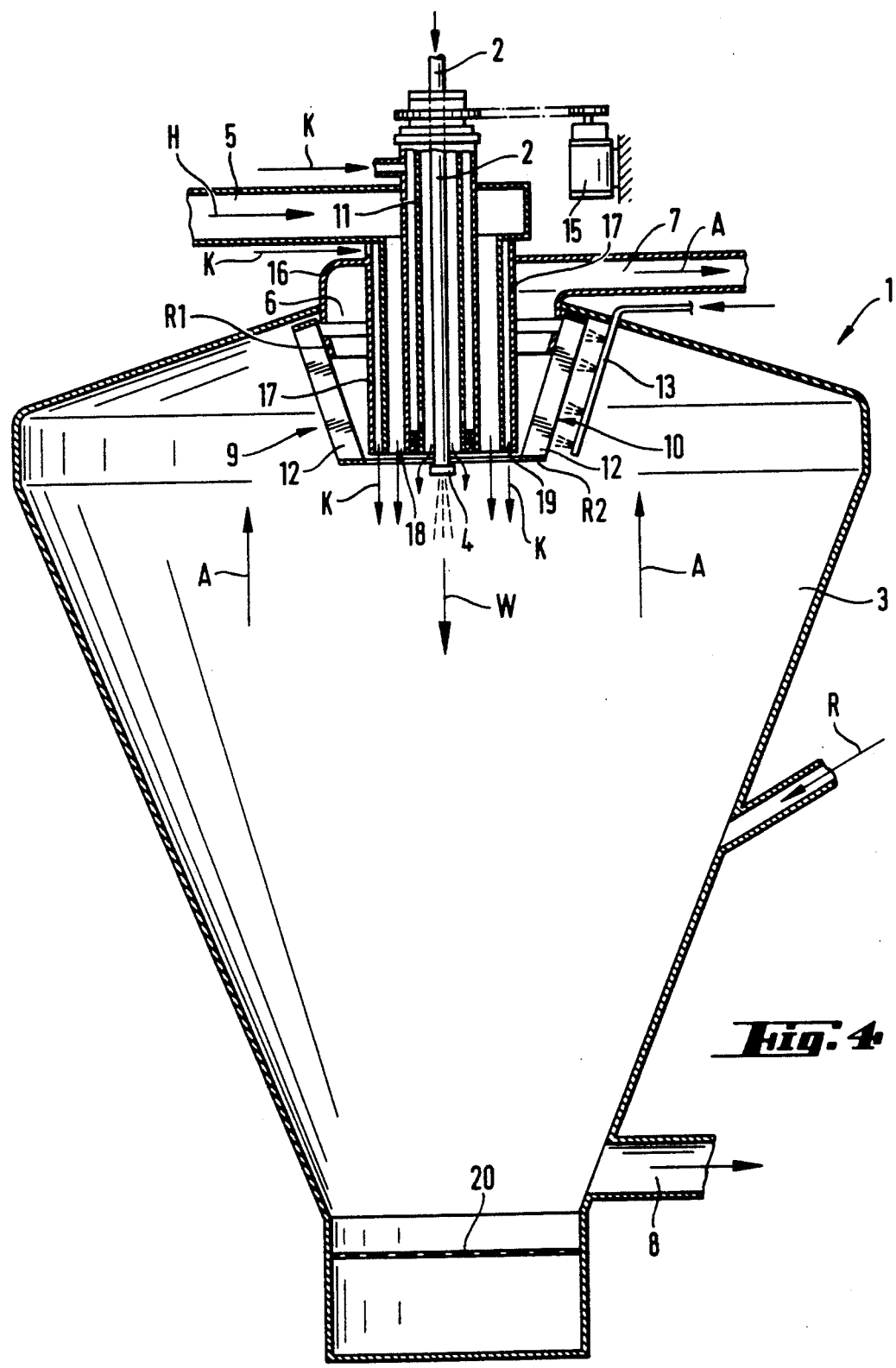
FIG. 4 shows an embodiment modified relative to FIG. 3 with respect to the discharge line for the drying gas and the proportion of fine materials entrained.

In the example of an embodiment according to FIGS. 4 and 5 particularly, the feeder tube 2 for the wet material is located within the feeder line 5 for the drying gas. It passes concentrically through the inlet 6 in the discharge line 7 and extends slightly over the axial height or length of the bucket wheel 10 located at the inlet 6 of the wind sifter 9, into the drying chamber 3. Therefore, there is only a single opening for the entry of the wet material and the drying air and for its exit in the upper area. This results in a reduction of the volume of the entire drying chamber 3 by an approximate factor of 3, while maintaining the same capacity. Simultaneously the product retention time in the dryer is reduced, which has a positive effect on the quality of the product.

From the detailed view in FIG. 5, it can be seen that the feeder tube 2 for the wet material, the feeder line 5 for the drying gas and the drive or rotating axle 11 of the bucket wheel 10 of the wind sifter 9, together with the bucket wheel itself, are coaxial with each other, and that the drive shaft 11 and the supply line 5 for the drying gas (including the feeder of the wet material) enter approximately in the center of the inlet 6 in the discharge line 7 into the drying chamber 3. This results in a space saving and compact layout, in which it is also expected that no product particles will remain suspended on the wall or roof of the drying chamber 3, even if the latter is dimensioned smaller. It is seen primarily in FIG. 5, but also in FIG. 4, that the feeder line 5 for the drying gas has a surrounding jacket 17 for the supply of cold air or inert gas. At the outlet opening 18 of the feeder line 5 for the drying gas, an annular gap 19 surrounding the outlet opening 18 is provided for the exit of the cold air. Thus, the exiting cold air acts to shield the drying gas entering the drying chamber at this point from the drying gas to be exhausted. With this arrangement, it is also assured that the wet material to be dried does not enter the wind sifter 9 prematurely. The annular space between the feeder line 5 and the rotating axle 11 is flushed with cold air or inert gas. This air (arrow K) flows at the bottom through openings 21 into the nozzle space and cools the lower bearing.

The supply of the wet material and of the drying gas, together with the coaxial drive shaft 11 of the bucket wheel 10 and the inlet opening 6 into the discharge line 7, are preferably coaxial with the axle of the drying chamber 3 and are thus located at its highest location, above the grain material discharge 8 and a fluid bed 20, respectively.

In the case of the fluidized spray driers or agglomerators according to FIGS. 3 to 5, the fine material component can be returned laterally into the drying chamber (arrow R).

It should also be mentioned that the blades 12 of the bucket wheel 10 may be made of a plastic, preferably polytetrafluoroethylene, or coated with it, in order to prevent the baking on of material and so that they may be cleaned readily.

In summary, a spray drier is disclosed in which it is possible to obtain a significantly improved separation of the grain material and fine material components within the drying chamber 3, such that any post-processing of the material carried out with the drying air may be reduced or eliminated. Simultaneously, expensive installations or complex forms of the drying chamber with annular channels, cyclones, or the like, may be avoided. That is, in spite of the provision of a wind sifter at the outlet of the drying air, the overall layout of the spray drier is reduced relative to the conventional configurations. Furthermore, in most cases the drying chamber 3 may be made smaller, while maintaining the same capacity.

It will be appreciated by those of ordinary skill in the art that the present invention can be embodied in other specific forms without departing from the spirit or essential characteristics thereof. The presently disclosed embodiments are therefore considered in all aspects to be illustrative and not restrictive. The scope of the invention is indicated by the appended claims rather than the foregoing description, and all changes that come within the meaning and range of equivalents thereof are intended to be embraced therein.

What is claimed is:

1. A spray drier for the preparation of powders or agglomerates by the drying of pumpable products comprising:

a dryer chamber having a feeder tube for introducing said products in fine particle form, and at least one connection and inlet for introducing drying gas into the drying chamber, said drying chamber having a powder discharge outlet and at least one exhaust discharge line for discharging the drying gas from said drying chamber, a wind sifter means being located at an outlet of said at least one exhaust discharge line, said wind sifter means further comprising;

a rotating bucket wheel having a drive shaft which wheel is operated by said wind sifter means against the flow of exhaust into said at least one exhaust discharge line; with said feeder tube, the inlet for the drying gas, the drive shaft and the bucket wheel being arranged coaxially relative to each other and with the axis of the drive shaft and the inlet for the drying gas including the feeder tube entering the drying chamber in the center of the inlet of said at least one exhaust discharge line.

2. Spray drier according to claim 1 containing means for adjusting the speed of the rotating bucket wheel.

3. Spray drier according to claim 1, wherein the drive shaft provided for the rotating bucket wheel of the wind sifter means coincides with an axis of said at least one exhaust discharge line at its inlet.

4. Spray drier according to claim 1, wherein said rotating bucket wheel includes individual, spaced apart bucket blades.

5. Spray drier according to claim 1, wherein the bucket wheel comprises a number of blades distributed uniformly over a circumference of at least two rings mounted spaced apart on the drive shaft for the rotating bucket wheel.

6. Spray drier according to claim 5, wherein the blades of the bucket wheel are formed as ridges.

7. Spray drier according to claim 5, wherein the blades of the bucket wheel are formed straight.

8. Spray drier according to claim 5, wherein the blades are inclined rearward relative to the radius of the bucket wheel as viewed in a direction of rotation of the bucket wheel, beginning at their point of fastening on the two rings.

9. Spray drier according to claim 5, wherein the depth of the blades amounts of about 20 to about 200 mm.

10. Spray drier according to claim 5, wherein the bucket wheel is conical in its configuration, with its larger circumference located directly in front of the inlet into said at least one exhaust discharge line.

11. Spray drier according to claim 10, wherein the larger diameter of the larger circumference of the bucket wheel is 0.2 m to 3.0 m.

12. Spray drier according to claim 11, wherein the height of the bucket wheel (12) and the larger diameter are substantially equal.

13. Spray drier according to claim 11, wherein a smaller diameter of the bucket wheel is 40% to 70% of the larger diameter.

14. Spray drier according to claim 1, wherein the bucket wheel has a larger diameter than said at least one exhaust discharge line at its inlet.

15. Spray drier according to claim 1, wherein a compressed air line leads to the wind sifter means, said compressed air line comprising at least one outlet nozzle directed against a blade area of the bucket wheel.

16. Spray drier according to claim 15, wherein said outer nozzle includes a plurality of parallel cleaning nozzles.

17. Spray drier according to claim 1, wherein said at least one exhaust discharge line contains at its inlet a deflecting elbow, and the drive shaft for the rotating bucket wheel passes through said elbow and an outside wall of said elbow, with a drive motor for said rotating bucket wheel being located outside the elbow.

18. Spray drier according to claim 1, wherein the feeder tube for the pumpable product is located within the inlet for the drying gas and passes concentrically through the inlet of said at least one exhaust discharge line and project over the axial height of the bucket wheel into the drying chamber.

19. Spray drier according to claim 1, wherein the inlet for the drying gas is provided with a jacket surrounding it for feeding ambient air, and at an opening of the inlet for the drying gas in the drying chamber, an annular gap is provided for outletting the ambient air and for shielding incoming drying gas at the inlet for the drying gas against drying gas to be exhausted.

20. Spray drier according to claim 1, wherein the feeder to be for the pumpable product, the inlet for the drying gas, the drive shaft of the bucket wheel and the inlet into said at least one exhaust discharge line, are located coaxially relative to the axis of the drying chamber.

* * * * *